United States Patent
Nakashima et al.

(10) Patent No.: US 9,654,026 B2
(45) Date of Patent: May 16, 2017

(54) THREE-LEVEL POWER CONVERTING APPARATUS WITH REDUCED CONDUCTION LOSS

(75) Inventors: Yukio Nakashima, Tokyo (JP); Takayoshi Miki, Tokyo (JP); Hisanori Yamasaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/419,672

(22) PCT Filed: Aug. 10, 2012

(86) PCT No.: PCT/JP2012/070562
§ 371 (c)(1),
(2), (4) Date: Feb. 5, 2015

(87) PCT Pub. No.: WO2014/024321
PCT Pub. Date: Feb. 13, 2014

(65) Prior Publication Data
US 2015/0214856 A1 Jul. 30, 2015

(30) Foreign Application Priority Data

Aug. 10, 2012 (WO) .................. PCT/JP2012/070562

(51) Int. Cl.
*H02M 7/537* (2006.01)
*H02M 7/487* (2007.01)
(Continued)

(52) U.S. Cl.
CPC .......... *H02M 7/537* (2013.01); *H02M 7/487* (2013.01); *H02M 2001/0048* (2013.01); *H02M 2001/327* (2013.01)

(58) Field of Classification Search
CPC .......... H02M 7/487; H02M 7/42; H02M 7/44; H02M 7/48; H02M 7/483; H02M 7/49;
(Continued)

(56) References Cited

U.S. PATENT DOCUMENTS 5,517,401 A    5/1996  Kinoshita et al.
5,801,936 A *  9/1998  Mori ................ H01L 23/04
                                              257/E23.136
(Continued)

FOREIGN PATENT DOCUMENTS

JP    5-211776 A    8/1993
JP    5-308778 A    11/1993
(Continued)

OTHER PUBLICATIONS

Office Action (Notice of Rejection) issued on Mar. 31, 2015, by the Japanese Patent Office in corresponding Japanese Patent Application No. 2014-529237, and an English translation of the Office Action. (5 pages).

(Continued)

*Primary Examiner* — Timothy J Dole
*Assistant Examiner* — Ivan Laboy Andino
(74) *Attorney, Agent, or Firm* — Buchanan Ingersoll & Rooney PC

(57) ABSTRACT

First to sixth switching elements forming a power conversion circuit for one phase in a three-level power converting apparatus include transistor elements and diode elements connected in reverse parallel to the transistor elements. Second, third, fifth, and sixth transistor elements are configured by MOSFETs that enable an electric current to flow in two directions.

11 Claims, 19 Drawing Sheets

(51) Int. Cl.
*H02M 1/00* (2006.01)
*H02M 1/32* (2007.01)

(58) Field of Classification Search
CPC ... H02M 7/537; H02M 7/5387; H02M 7/5388
USPC ...... 363/16–17, 37–43, 52–55, 56.01–56.02, 363/71, 84, 89, 95–98, 123, 125, 363/131–132, 135–136
See application file for complete search history.

(56) References Cited

U.S. PATENT DOCUMENTS

| | | | | |
|---|---|---|---|---|
| 6,288,921 | B1* | 9/2001 | Uchino | H02M 7/527 363/132 |
| 6,535,406 | B1 | 3/2003 | Asaeda et al. | |
| 6,697,274 | B2 | 2/2004 | Bernet et al. | |
| 7,508,640 | B2 | 3/2009 | Knapp et al. | |
| 8,111,530 | B2 | 2/2012 | Ono et al. | |
| 2003/0048650 | A1* | 3/2003 | Asaeda | H02M 7/487 363/98 |
| 2003/0165071 | A1* | 9/2003 | Bernet | H02M 7/487 363/137 |
| 2007/0153555 | A1* | 7/2007 | Stulz | H02M 7/49 363/20 |
| 2008/0204959 | A1* | 8/2008 | Knapp | H02H 7/1225 361/100 |
| 2010/0315776 | A1* | 12/2010 | Ono | H02M 7/487 361/689 |
| 2010/0327837 | A1* | 12/2010 | Tsugawa | H02M 1/32 323/285 |
| 2011/0074489 | A1* | 3/2011 | Viitanen | H02M 1/08 327/427 |
| 2011/0115532 | A1* | 5/2011 | Roesner | H02M 7/487 327/136 |
| 2012/0120698 | A1* | 5/2012 | Viitanen | H02M 7/487 363/126 |

FOREIGN PATENT DOCUMENTS

| | | | | |
|---|---|---|---|---|
| JP | 7-046849 | A | 2/1995 | |
| JP | 3229931 | B2 | 11/2001 | |
| JP | 2004-509591 | A | 3/2004 | |
| JP | 2004-356499 | A | 12/2004 | |
| JP | 3625439 | B2 | 3/2005 | |
| JP | 2005-137045 | A | 5/2005 | |
| JP | 2005-176538 | A | 6/2005 | |
| JP | 2006-014532 | A | 1/2006 | |
| JP | 2006246576 | A * | 9/2006 | ............ H02M 7/483 |
| JP | 2008-017237 | A | 1/2008 | |
| JP | 2008-503194 | A | 1/2008 | |
| JP | 2010-115045 | A | 5/2010 | |
| JP | 4491718 | B2 | 6/2010 | |
| JP | 2010-200585 | A | 9/2010 | |
| JP | 2010-259241 | A | 11/2010 | |
| JP | 2012-039866 | A | 2/2012 | |
| WO | WO 02/23703 | A1 | 3/2002 | |
| WO | WO 2005/124961 | A1 | 12/2005 | |
| WO | WO 2008/075418 | A1 | 6/2008 | |

OTHER PUBLICATIONS

International Search Report (PCT/ISA/210) mailed on Nov. 13, 2012, by the Japanese Patent Office as the International Searching Authority for International Application No. PCT/JP2012/070562.
Written Opinion (PCT/ISA/237) mailed on Nov. 13, 2012, by the Japanese Patent Office as the International Searching Authority for International Application No. PCT/JP2012/070562.
Japanese Office Action mailed Jan. 6, 2015 for Application No. 2014-529237, 2 pages (with English language translation, pp. 1-5).
Nov. 16, 2016 extended European Search Report issued by the European Patent Office in European Application No. 12882860.5 (7 pages).

* cited by examiner (1) ELEMENT CURRENT>0, U-PHASE VOLTAGE=+1

(2) ELEMENT CURRENT>0, U-PHASE VOLTAGE=0

(3) ELEMENT CURRENT>0, U-PHASE VOLTAGE=−1

(4) ELEMENT CURRENT<0, U-PHASE VOLTAGE=+1

(5) ELEMENT CURRENT<0, U-PHASE VOLTAGE=0

(6) ELEMENT CURRENT<0, U-PHASE VOLTAGE=-1

(1) ELEMENT CURRENT>0, U-PHASE VOLTAGE=+1

(2) ELEMENT CURRENT>0, U-PHASE VOLTAGE=0

(3) ELEMENT CURRENT>0, U-PHASE VOLTAGE=-1

(4) ELEMENT CURRENT<0, U-PHASE VOLTAGE=+1

(5) ELEMENT CURRENT<0, U-PHASE VOLTAGE=0

(6) ELEMENT CURRENT<0, U-PHASE VOLTAGE=-1

(1) ELEMENT CURRENT>0, U-PHASE VOLTAGE=0

(2) ELEMENT CURRENT>0, U-PHASE VOLTAGE=0

(3) ELEMENT CURRENT>0, U-PHASE VOLTAGE=0

(4) ELEMENT CURRENT>0, U-PHASE VOLTAGE=0

(5) ELEMENT CURRENT>0, U-PHASE VOLTAGE=0

(6) ELEMENT CURRENT>0, U-PHASE VOLTAGE=0

(7) ELEMENT CURRENT>0, U-PHASE VOLTAGE=0

(1) ELEMENT CURRENT<0, U-PHASE VOLTAGE=0

(2) ELEMENT CURRENT<0, U-PHASE VOLTAGE=0

(3) ELEMENT CURRENT<0, U-PHASE VOLTAGE=0

(4) ELEMENT CURRENT<0, U-PHASE VOLTAGE=0

(5) ELEMENT CURRENT<0, U-PHASE VOLTAGE=0

(6) ELEMENT CURRENT<0, U-PHASE VOLTAGE=0

THREE-LEVEL POWER CONVERTING APPARATUS WITH REDUCED CONDUCTION LOSS

FIELD

The present invention relates to a three-level power converting apparatus.

BACKGROUND

The conventional three-level power converting apparatus includes first and second IGBTs sequentially connected in series between an upper-side direct-current terminal P and an alternating-current terminal AC, a first coupling (clamp) diode connected between a connection point of the first and second IGBTs and an intermediate potential terminal C, third and fourth IGBTs sequentially connected in series between the alternating-current terminal AC and a lower-side direct-current terminal N, and a second coupling (clamp) diode connected between a connection point of the third and fourth IGBTs and the intermediate potential terminal C. The three-level power converting apparatus is configured to controlling the first to fourth IGBTs to be turned on and off as appropriate to output voltages in three levels from the alternating-current terminal AC (e.g., Patent Literature 1 described below).

In the conventional three-level power converting apparatus, balance resistors for potential stabilization are connected in parallel to the respective first and second coupling diodes (e.g., Patent Literature 2 described below).

CITATION LIST

Patent Literature

Patent Literature 1: Japanese Patent No. 3229931
Patent Literature 2: WO 2008/075418

SUMMARY

Technical Problem

However, in the three-level power converting apparatus, there is a problem in that, because there is only one current path and the current density of the path increases when potential same as the potential of an intermediate potential terminal (also referred to as "neutral point") is output, a conduction loss increases and an element located on the intermediate potential terminal side sometimes has higher temperature than the other elements.

The present invention has been devised in view of the above and it is an object of the present invention to provide a three-level power converting apparatus that can attain a reduction in a conduction loss.

Solution to Problem

In order to solve the aforementioned problems, a three-level power converting apparatus according to one aspect of the present invention includes: a power conversion circuit for one phase that selects potential of any one of an upper-side direct-current terminal, an intermediate potential terminal, and a lower-side direct-current terminal and outputs the potential to an alternating-current terminal, the power conversion circuit including first, second, third, and fourth switching elements sequentially connected in series between the upper-side direct-current terminal and the lower-side direct-current terminal, a fifth switching element connected between a connecting section of the first switching element and the second switching element and the intermediate potential terminal, and a sixth switching element connected between a connecting section of the third switching element and the fourth switching element and the intermediate potential terminal, and the alternating-current terminal being connected to a connecting section of the second switching element and the third switching element, wherein the respective first to sixth switching elements include transistor elements and diode elements connected in reverse parallel to the transistor elements, and the transistor elements of the second, third, fifth, and sixth switching elements are configured by MOSFETs.

Advantageous Effects of Invention

According to the present invention, it is possible to attain a reduction in a conduction loss in the three-level power converting apparatus.

BRIEF DESCRIPTION OF DRAWINGS

FIG. 2-1 is a diagram of an operation state and a current flow path of a power conversion circuit according to the first embodiment ((1) an element current>0 and a U-phase voltage=+1 and (2) the element current>0 and the U-phase voltage=0).

FIG. 2-2 is a diagram of an operation state and a current flow path of the power conversion circuit according to the first embodiment ((3) the element current>0 and the U-phase voltage=−1 and (4) the element current<0 and the U-phase voltage=+1).

FIG. 2-3 is a diagram of an operation state and a current flow path of the power conversion circuit according to the first embodiment ((5) the element current<0 and the U-phase voltage=0 and (6) the element current<0 and the U-phase voltage=−1).

FIG. 3-1 is a diagram of an operation state and a current flow path of a power conversion circuit having the conventional configuration, in which an IGBT and a clamp diode is used, shown as a comparative example ((1) the element current>0 and the U-phase voltage=+1 and (2) the element current>0 and the U-phase voltage=0).

FIG. 3-2 is a diagram of an operation state and a current flow path of the power conversion circuit having the conventional configuration, in which the IGBT and the clamp diode are used, shown as the comparative example ((3) the element current>0 and the U-phase voltage=−1 and (4) element current<0 and the U-phase voltage=+1).

FIG. 3-3 is a diagram of an operation state and a current flow path of the power conversion circuit having the conventional configuration, in which the IGBT and the clamp diode are used, shown as the comparative example ((5) element current<0 and the U-phase voltage=0 and (6) element current<0 and the U-phase voltage=−1).

FIG. 4-1 is a diagram for explaining a control operation for suppressing the temperature of a part of switching elements when the U-phase voltage=0 and the element current is positive (the element current>0) ((1) second: ON, third: ON, fifth: ON, and sixth: ON and (2) second: OFF, third: ON, fifth: ON, and sixth: ON).

FIG. 4-2 is a diagram for explaining a control operation for suppressing the temperature of a part of the switching elements when the U-phase voltage=0 and the element current is positive (the element current>0) ((3) second: ON, third: ON, fifth: OFF, and sixth: ON and (4) second: OFF, third: ON, fifth: OFF, and sixth: ON).

FIG. 4-3 is a diagram for explaining a control operation for suppressing the temperature of a part of the switching elements when the U-phase voltage=0 and the element current is positive (the element current>0) ((5) second: ON, third: ON, fifth: ON, and sixth: OFF and (6) second: ON, third: OFF, fifth: ON, and sixth: ON).

FIG. 4-4 is a diagram for explaining a control operation for suppressing the temperature of a part of the switching elements when the U-phase voltage=0 and the element current is positive (the element current>0) ((7) second: ON, third: OFF, fifth: ON, and sixth: OFF).

FIG. 5-1 is a diagram for explaining a control operation for suppressing the temperature of a part of the switching elements when the U-phase voltage=0 and the element current is negative (the element current<0) ((1) second: ON, third: ON, fifth: ON, and sixth: ON and (2) second: ON, third: ON, fifth: OFF, and sixth: ON).

FIG. 5-2 is a diagram for explaining a control operation for suppressing the temperature of a part of the switching elements when the U-phase voltage=0 and the element current is negative (the element current<0) ((3) second: OFF, third: ON, fifth: ON, and sixth: ON and (4) second: OFF, third: ON, fifth: OFF, and sixth: ON).

FIG. 5-3 is a diagram for explaining a control operation for suppressing the temperature of a part of the switching elements when the U-phase voltage=0 and the element current is negative (the element current<0) ((5) second: ON, third: OFF, fifth: ON, and sixth: ON and (6) second: ON, third: ON, fifth: ON, and sixth: OFF).

FIG. 5-4 is a diagram for explaining a control operation for suppressing the temperature of a part of the switching elements when the U-phase voltage=0 and the element current is negative (the element current<0) ((7) second: ON, third: OFF, fifth: ON, and sixth: OFF).

DESCRIPTION OF EMBODIMENTS

Three-level power converting apparatuses according to embodiments of the present invention are explained below with reference to the accompanying drawings. Note that the present invention is not limited by the embodiments explained below.

First Embodiment

Figure 1:
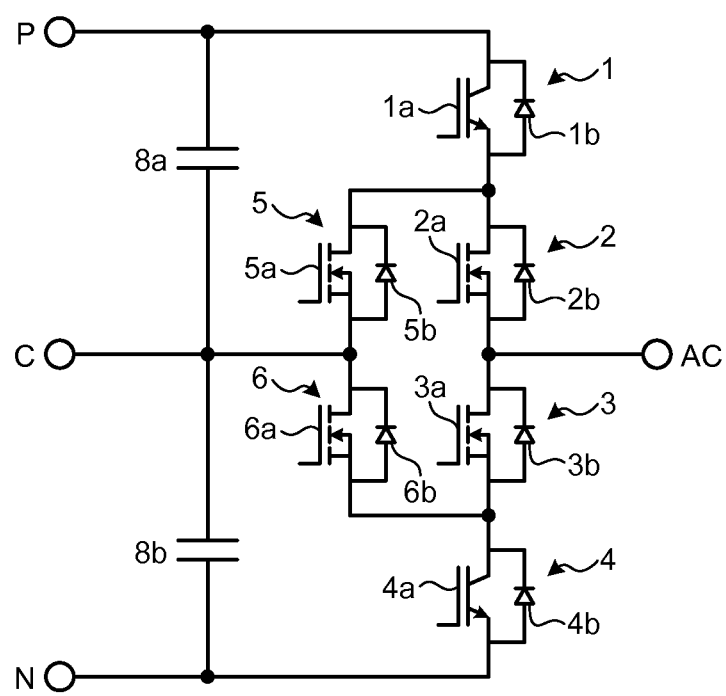
FIG. 1 is a partial circuit diagram for explaining the circuit configuration of a three-level power converting apparatus according to a first embodiment.

FIG. 1 is a partial circuit diagram for explaining the circuit configuration of a three-level power converting apparatus according to a first embodiment of the present invention. The configuration of a power conversion circuit for one phase in the three-level power converting apparatus is shown. In the power conversion circuit for one phase, as shown in FIG. 1, first to fourth switching elements (1 to 4) are sequentially connected in series in this order between an upper-side direct-current terminal P and a lower-side direct-current terminal N. A fifth switching element 5 is connected between a connecting section of the first switching element 1 and the second switching element 2 and an intermediate potential terminal C. A sixth switching element 6 is connected between a connecting section of the third switching element 3 and the fourth switching element 4 and the intermediate potential terminal C. An alternating-current terminal AC is connected to a connecting section of the second switching element 2 and the third switching element 3. The intermediate potential terminal C can be considered to be connected to a connecting section of the fifth switching element 5 and the sixth switching element 6. Capacitors 8a and 8b that retain a direct-current voltage are provided between the upper-side direct-current terminal P and the lower-side direct-current terminal N, and a connection point of the capacitors 8a and 8b is connected to the intermediate potential terminal C. Note that the fifth switching element 5 is a neutral point clamp element on a high potential side that operates to keep the potential of the alternating-current terminal AC at the potential of the intermediate potential terminal C when an electric current flows to the alternating-current terminal AC. The sixth switching element 6 is a neutral point clamp element on a low potential side that operates when an electric current flows from the alternating-current terminal AC. The power conversion circuit for one phase selects the potential of any one of the upper-side direct-current terminal P, the neutral potential terminal C, and the lower-side direct-current terminal N and outputs the potential to the alternating-current terminal AC.

That is, the power conversion circuit for one phase according to the first embodiment includes the first switching element 1 located on the outer side of the high potential side, the second switching element 2 located on the inner side of the high potential side, the third switching element 3 located on the inner side of the low potential side, the fourth switching element 4 located on the outer side of the low potential side, the fifth switching element 5 that operates as a neutral point clamp element on the high potential side, and the sixth switching element 6 that operates as a neutral point clamp element on the low potential side.

The first switching element 1 is configured by an IGBT 1a, which is a transistor element, and a diode element (hereinafter referred to as "FWD") 1b that operates as a so-called flywheel diode connected in reverse parallel to the IGBT 1a. Similarly, the fourth switching element 4 is configured by an IGBT 4a and an FWD 4b connected in reverse parallel to the IGBT 4a.

On the other hand, the second switching element 2 is configured by a MOSFET 2a, which is a transistor element, and an FWD 2b connected in reverse parallel to the MOSFET 2a. The third switching element 3 is configured the same. The third switching element 3 is configured by a MOSFET 3a and an FWD 3b connected in reverse parallel to the MOSFET 3a. The fifth switching element 5 and the sixth switching element 6 are configured the same. The fifth switching element 5 is configured by a MOSFET 5a and an FWD 5b connected in reverse parallel to the MOSFET 5a. The sixth switching element 6 is configured by a MOSFET 6a and an FWD 6b connected in reverse parallel to the MOSFET 6a. Whereas an IGBT can feed an electric current only in one direction, a MOSFET can feed an electric current to a channel in two directions.

The difference between the second switching element 2, the third switching element 3, the fifth switching element 5, and the sixth switching element 6 and the first switching element and the fourth switching element 4 explained above is characteristics of transistor elements in use. Specifically, transistor elements used in the second switching element 2, the third switching element 3, the fifth transistor element 5, and the sixth switching element 6 are MOSFETs that enable an electric current to flow to a channel in two directions. On the other hand, transistor elements used in the first switching element 1 and the fourth switching element 4 are IGBTs in which an electric current flows only in one direction. That is, one of the points of the power conversion circuit according to the first embodiment is that transistor elements of the second switching element 2, the third switching element 3, the fifth switching element 5, and the sixth switching element 6 are configured by transistor elements that can feed an electric current in two directions. Note that flowing of an electric current is referred to as a "current flow" and a path in which an electric current flows is referred to as a "current flow path".

Note that body diodes, which are characteristics in structure, are present in the MOSFETs. In the configuration explained above, because the body diodes are used, among the switching elements and the clamp elements, each of the second switching element 2, the third switching element 3, the fifth switching element 5, and the sixth switching element 6, including a MOSFET that enables an electric current to flow in two directions, does not have to include an FWD connected in reverse parallel. Note that when the first switching element and the fourth switching element enable an electric current to flow in two directions and include the MOSFETs in which the body diodes are present in terms of structure, the first switching element and the fourth switching element do not have to include FWDs connected in reverse parallel either.

Figure 2:
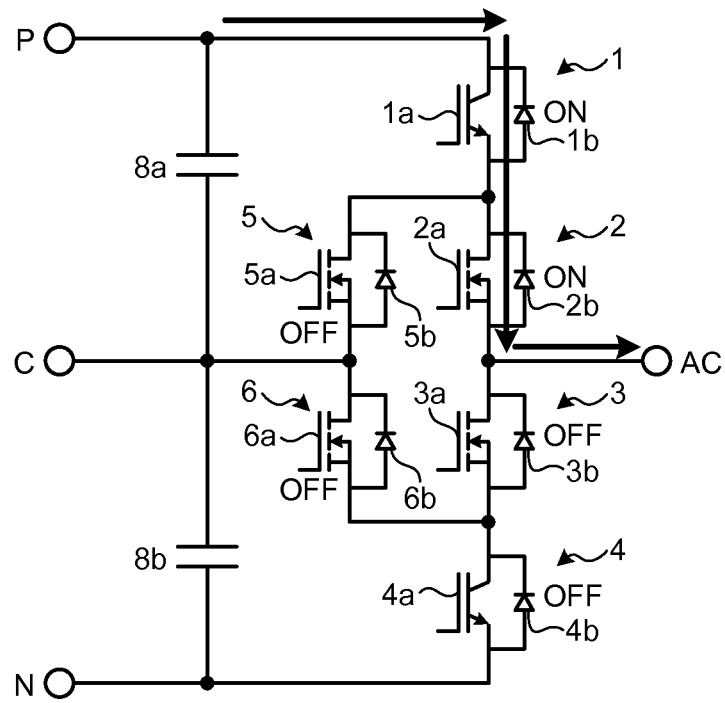
Figure 1:
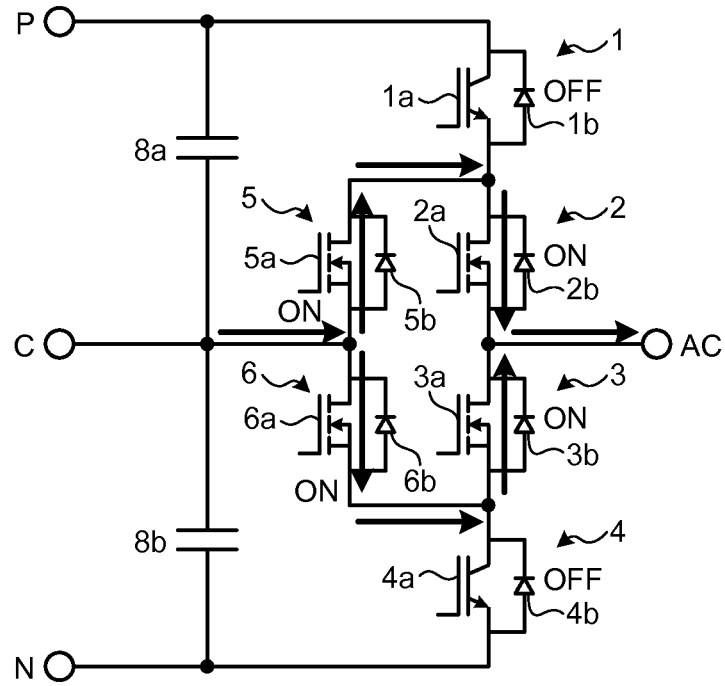
Figure 2:
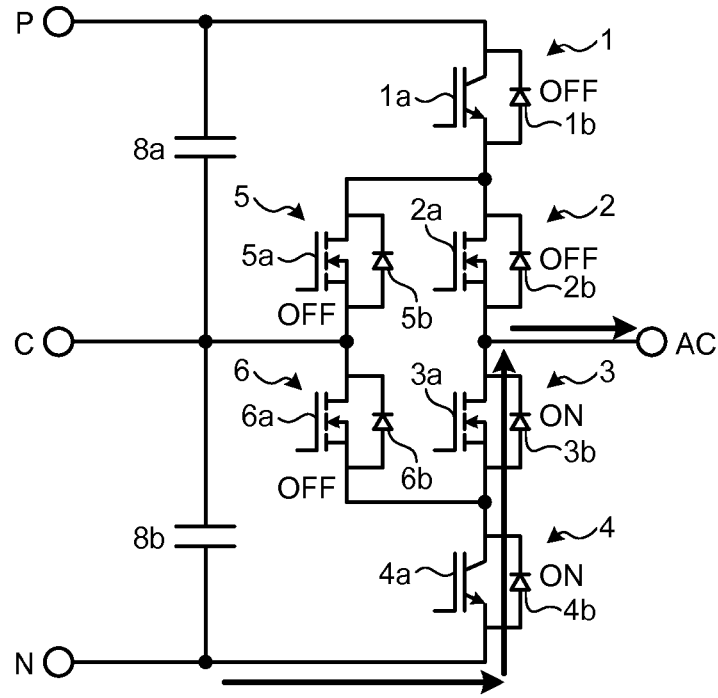
Figure 2:
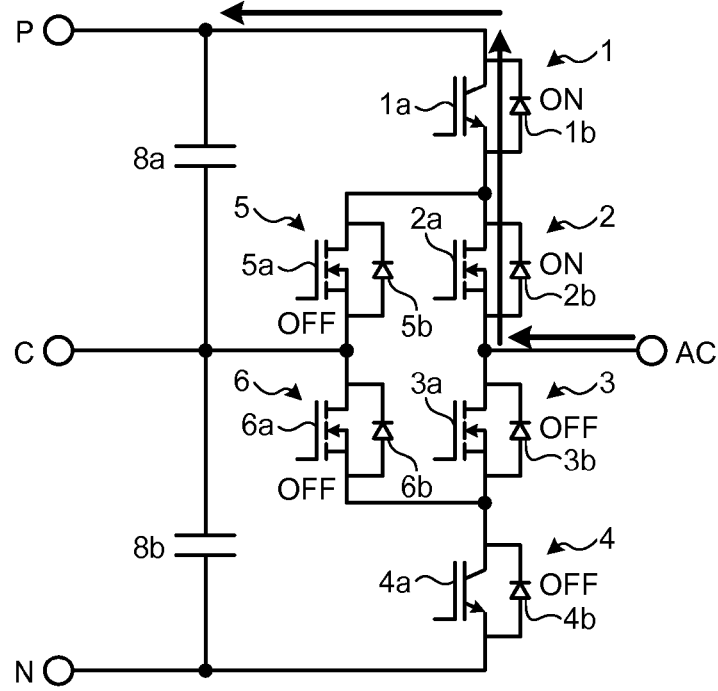
Figure 2:
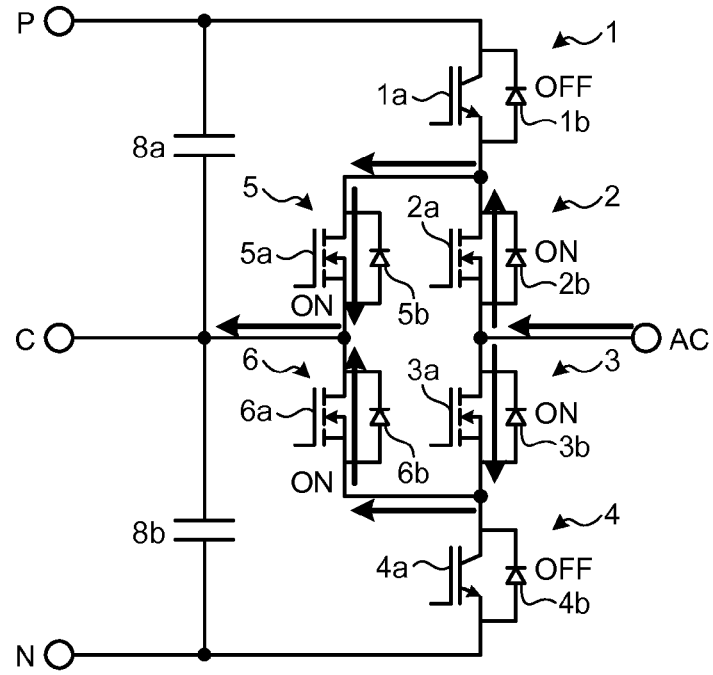
Figure 3:
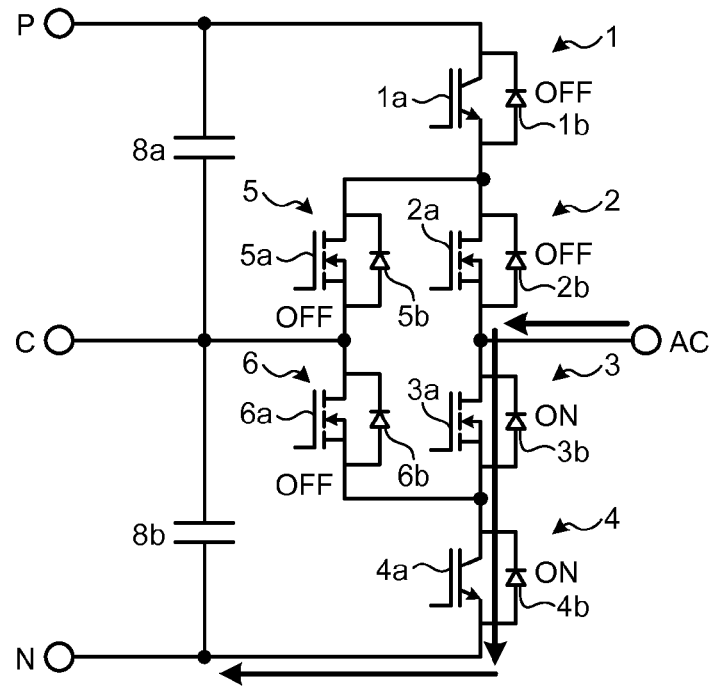
Figure 3:
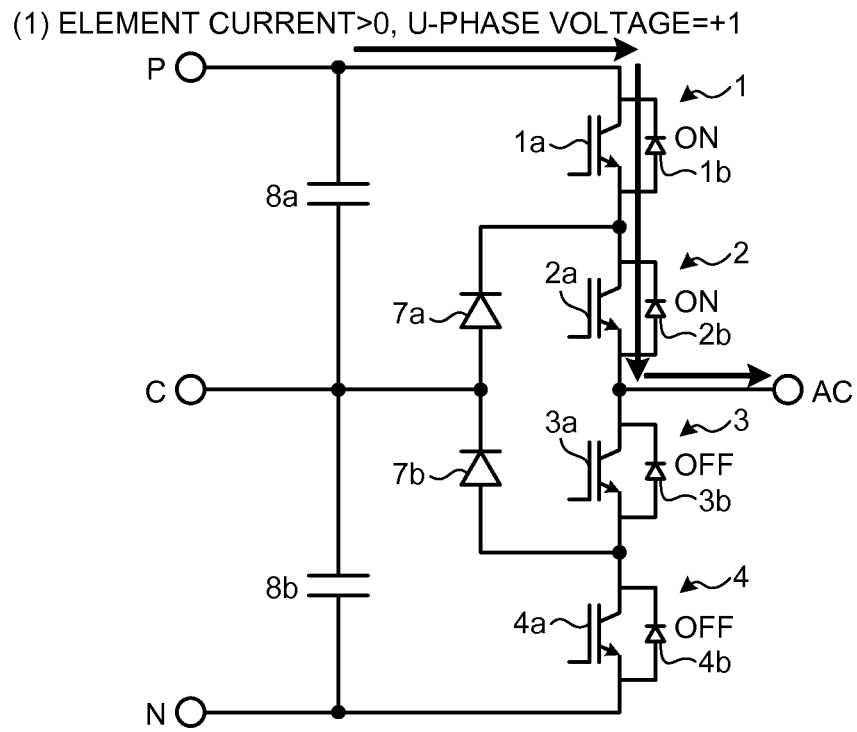
Figure 1:
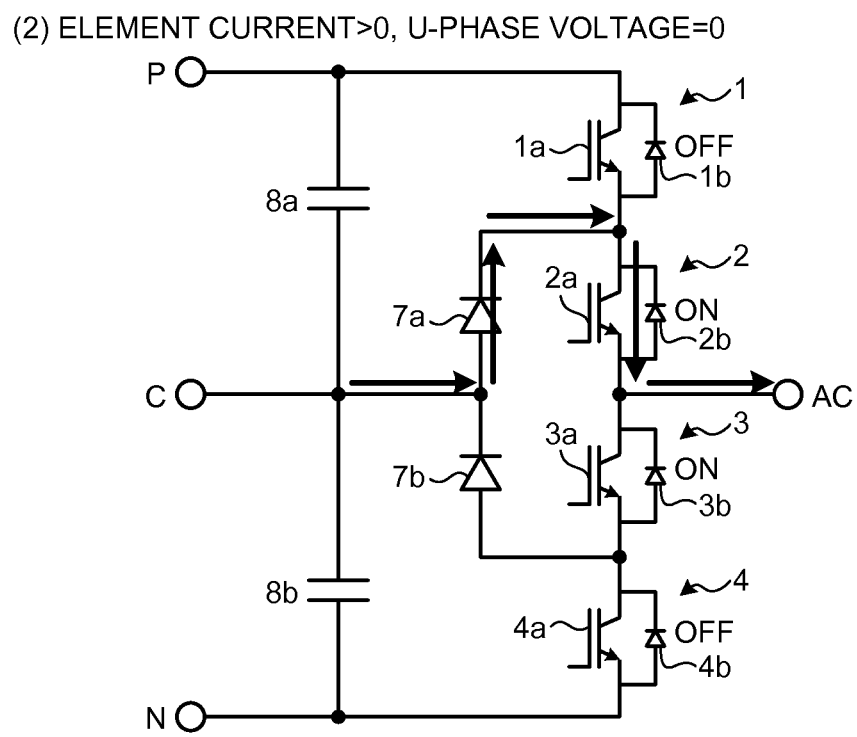
Figure 3:
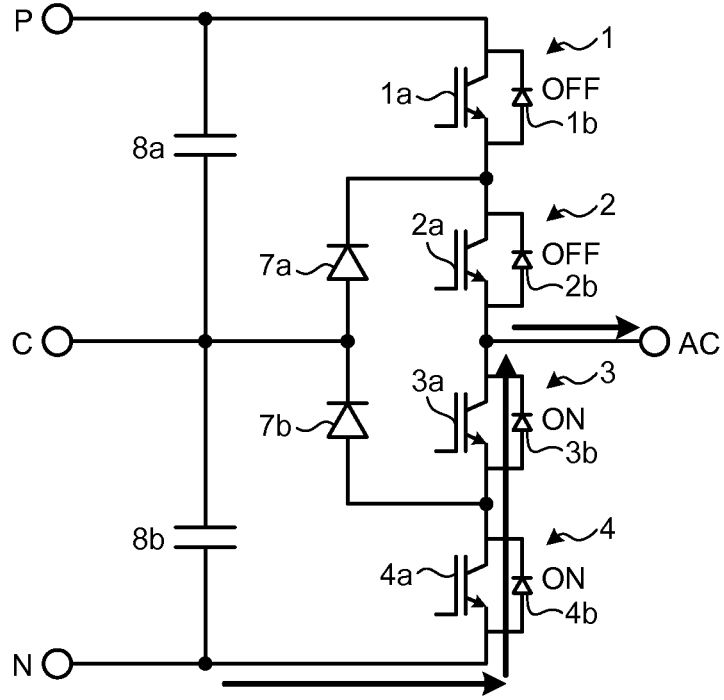
Figure 2:
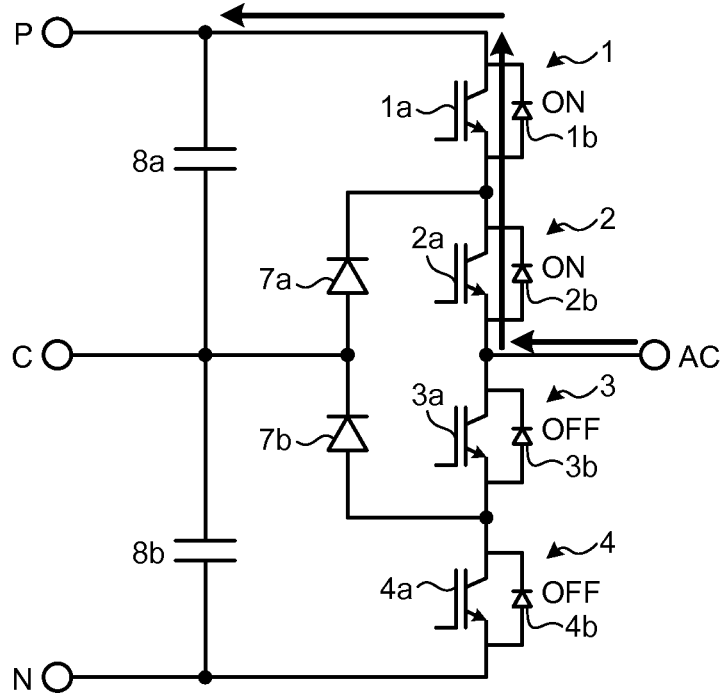
Figure 3:
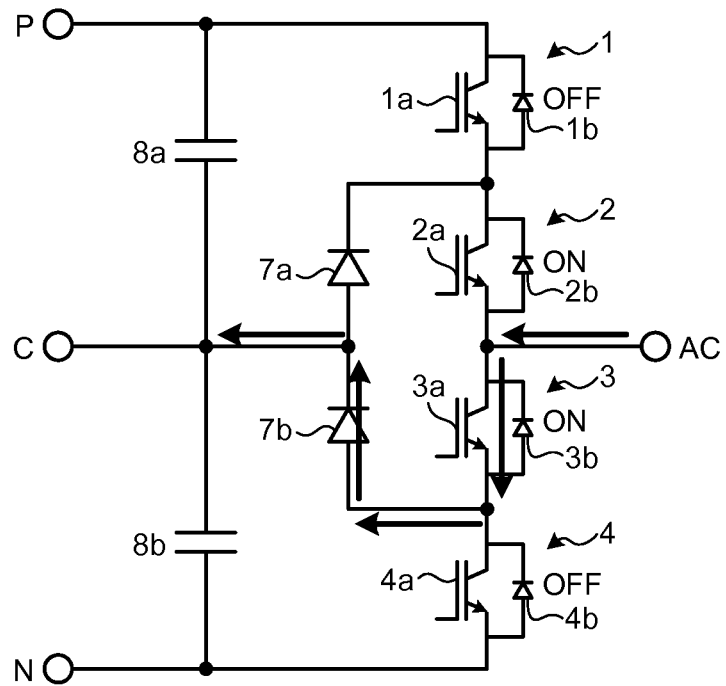
Figure 3:
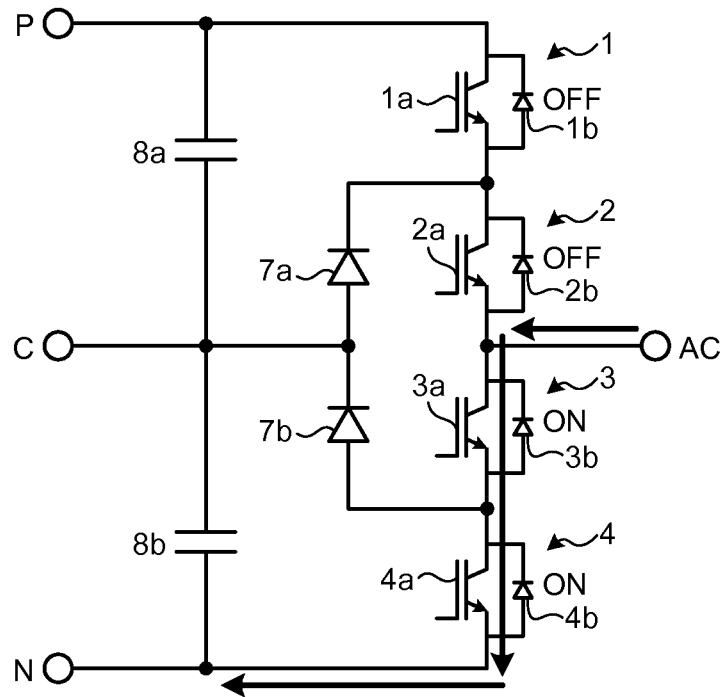

The operation of the three-level power converting apparatus according to the first embodiment is explained. FIG. 2-1 to FIG. 2-3 are diagrams of an operation state and a current flow path of the power conversion circuit (e.g., a U phase) according to the first embodiment. FIG. 3-1 to FIG. 3-3 are diagrams of an operation state and a current flow path of a power conversion circuit having the conventional configuration, in which an IGBT and a clamp diode are used, shown as a comparative example. In FIG. 2 and FIG. 3, paths indicated by arrows indicate current flow paths of an electric current flowing to any one of a switching element, a clamp element, and a clamp diode (hereinafter referred to as "element current"). Here, note that the direction of the element current flowing out to the alternating-current terminal AC is set as positive direction. Application of the potential (positive electrode potential) of the upper-side direct-current terminal P to the alternating-current terminal AC is referred to as "U-phase voltage=+1". Application of the potential (negative electrode potential) of the lower-side direct-current terminal N to the alternating-current terminal AC is referred to as "U-phase voltage=−1". Application of the potential (neutral point potential) of the intermediate potential terminal C to the alternating-current terminal AC is referred to as "U-phase voltage=0". The same applies to the description below.

When FIG. 2-1 to FIG. 2-3 and FIG. 3-1 to FIG. 3-3 are compared, in operation states of "the element current>0 and the U-phase voltage=+1", "the element current>0 and the U-phase voltage=−1", "the element current<0 and the U-phase voltage=+1", and "the element current<0 and the U-phase voltage=−1", as shown in (1), (3), (4), and (6) of the figures, elements subjected to current flow control and current flow paths are the same. On the other hand, in operation states of "the element current>0 and the U-phase voltage=0" and "the element current<0 and the U-phase voltage=0", as shown in (2) and (5) of the figures, current flow paths in the operation states are different. Specifically, the operation is as explained below. Note that, in the following explanation, conduction is also referred to as "ON" and non-conduction is also referred to as "OFF".

In the three-level power converting apparatus according to the first embodiment, when the "U-phase voltage=0", that is, neutral point potential is output to the alternating-current terminal AC, as shown in FIG. 2-1 (2) and FIG. 2-3 (5), the MOSFETs of the second switching element 2, the third switching element 3, the fifth switching element 5, and the sixth switching element 6 are controlled so as to be turned on. Note that, in the configuration shown in FIG. 3, the second switching element 2 and the third switching element 3 are controlled so as to be turned on. However, because only clamp diodes 7a and 7b are connected to the neutral point, when "the element current>0 and the U-phase voltage=0", only a path formed by the clamp diode 7a and the second switching element 2 is a current flow path. Similarly, when "the element current<0 and the U-phase voltage=0", only a path formed by the clamp diode 7b and the third switching element 3 is set as a current flow path. In this way, in the conventional configuration, there are two paths for outputting the neutral point potential to the alternating-current terminal AC. However, the two paths cannot be simultaneously used.

On the other hand, in the first embodiment, it is possible to increase paths for outputting the neutral point potential to the alternating-current terminal AC so as to be more than the paths in the past by causing the MOSFETs of the second switching element 2, the third switching element 3, and the fifth switching element 5 to perform the ON operation. Because the MOSFETs enable an electric current to flow to a channel in two directions, it is possible to simultaneously feed an electric current to both of a path passing through the fifth switching element 5 and the second switching element 2 and a path passing through the sixth switching element 6 and the third switching element 3.

The FWDs are connected in reverse parallel to the MOSFETs, and the body diodes, which are the characteristics in structure, are present in the MOSFETs. Therefore, in place where an electric current flows only to the FWD in the past, an electric current can be simultaneously fed to three paths of the channel of the MOSFET, the body diode, and the FWD. Specifically, when the element current>0 and the U-phase voltage=0, as the path passing through the fifth switching element 5, three paths of the channel of the MOSFET, the body diode, and the FWD can be used. As paths passing through the third switching element 3, three paths of the channel of the MOSFET, the body diode, and the FWD can be used. Similarly, when the element current<0 and the U-phase voltage=0, as the paths passing through the second switching element 2, three paths of the channel of the MOSFET, the body diode, and the FWD can be used. As paths passing through the sixth switching element 6, three paths of the channel of the MOSFET, the body diode, and the FWD can be used.

As explained above, when the neutral point potential is output to the alternating-current terminal AC, the neutral point potential output through one path in the past can be divided into two or more paths and output. Therefore, it is possible to reduce a conduction loss of the switching elements. Because an electric current can be divided, it is possible to disperse heat values of the switching elements and attain simplification of a cooler. Further, it is possible to reduce a current capacity of at least either one of the second switching element 2, the third switching element 3, the fifth switching element 5, and the sixth switching element 6 so as to be smaller than the current capacity in the past.

Note that, in the above explanation, the control operation for using, in outputting the neutral point potential to the alternating-current terminal AC, the path of the intermediate potential terminal C→the fifth switching element 5→the second switching element 2→the alternating-current terminal AC and the path of the intermediate potential terminal C→the sixth switching element 6→the third switching element 3→the alternating-current terminal AC is explained. However, it is also effective to perform control for properly using the paths to suppress the temperature of power modules (the switching elements). The control is explained below.

It is a well-known fact that, when the three-level power converting apparatus is caused to operate, a temperature level difference occurs among the power modules. To protect the power modules, temperature sensors are sometimes provided in the power modules and the cooler. The temperature of the power modules can be estimated. Even if the temperature sensors are not provided, a temperature level difference among the power modules can also be estimated from a history of control signals to the power modules. Therefore, for example, when it is estimated that a part of the power modules has high temperature compared with the other or when it is estimated that, although a part of the power modules does not currently particularly have high temperature compared with the other, a temperature rise in the nearest time of determined length is large because of a change of a control signal or a temperature rise is about to be caused, it is effective to perform control to reduce an electric current of a path including the power module or not to feed the electric current. Suppressing temperature means that the temperature is lowered, the temperature is not raised, or, although the temperature rises, an amount of the rise is reduced.

A power module having the highest temperature is a power module including a MOSFET or a diode element having the highest temperature. A power module having the largest temperature rise is a power module including a MOSFET or a diode element having the largest temperature rise. Note that, when it is predicted that a temperature rise is about to be largest in a power module, the power module is also included in the power module having the largest temperature rise.

Figure 4:
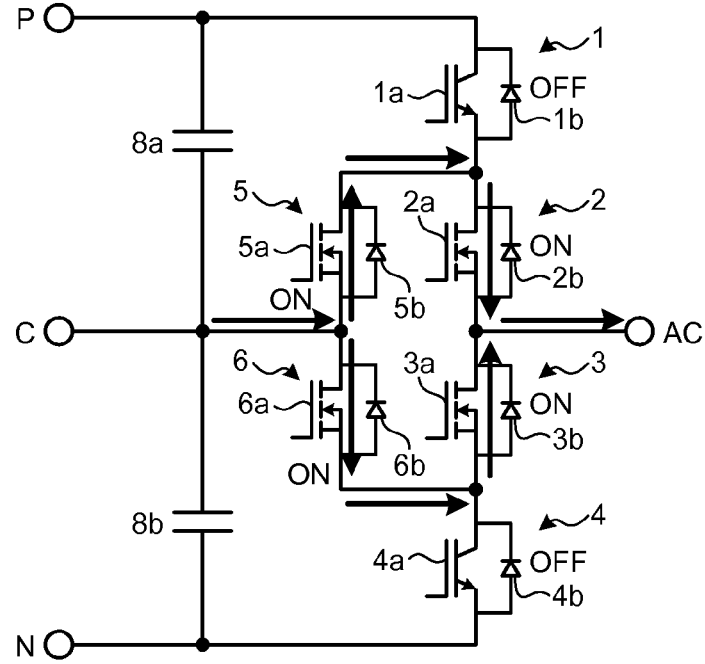
Figure 1:
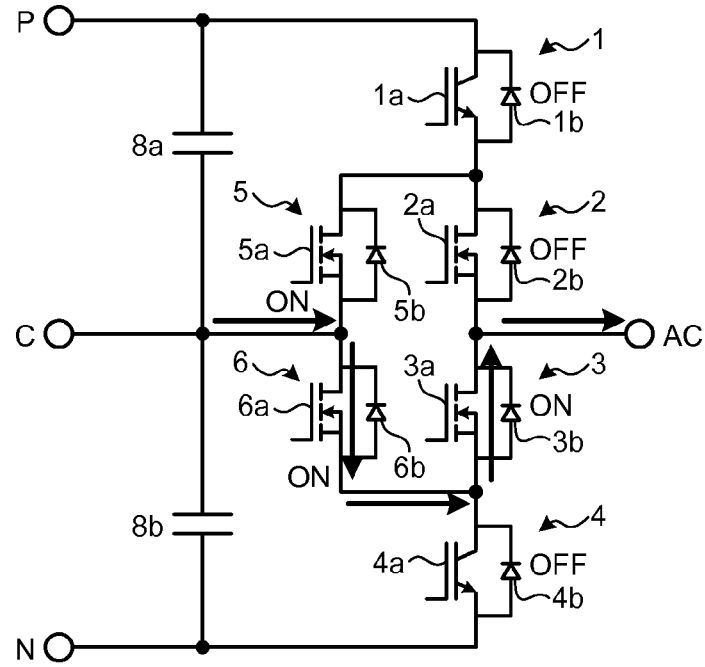
Figure 4:
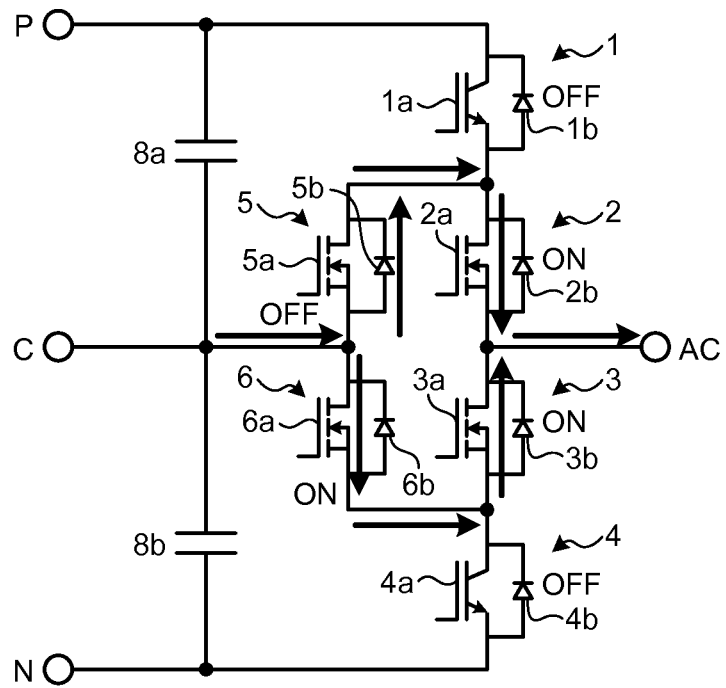
Figure 2:
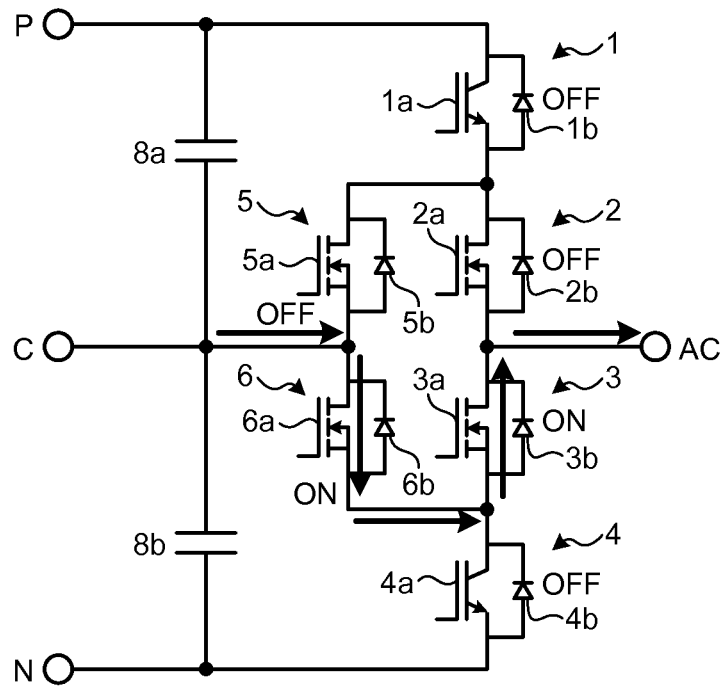
Figure 4:
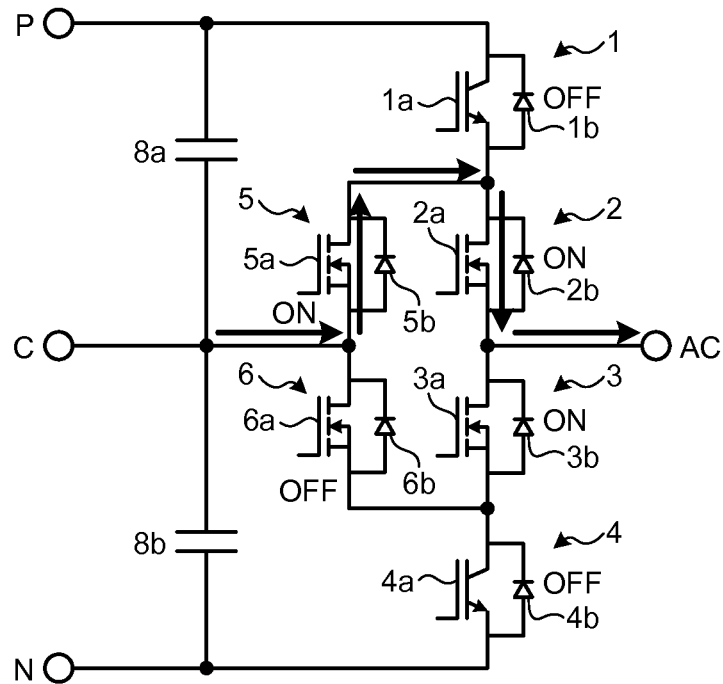
Figure 3:
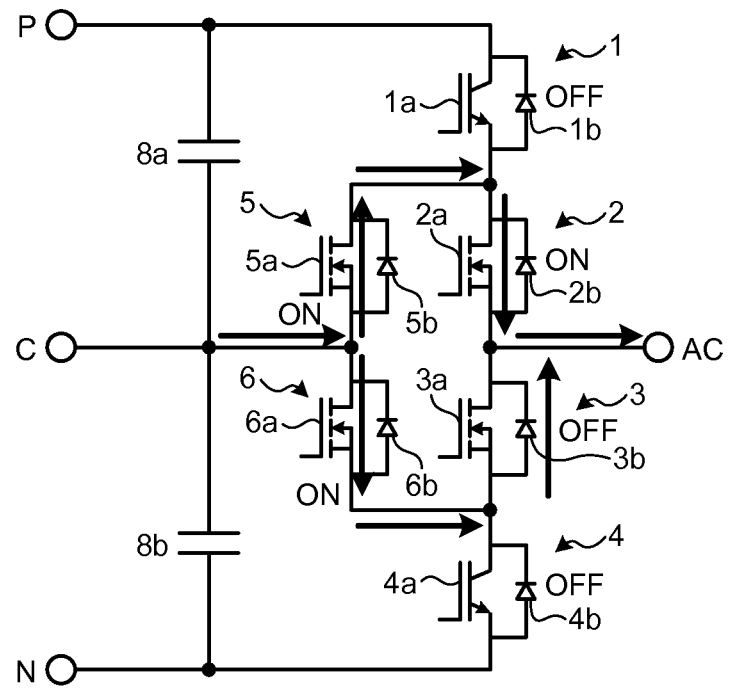
Figure 4:
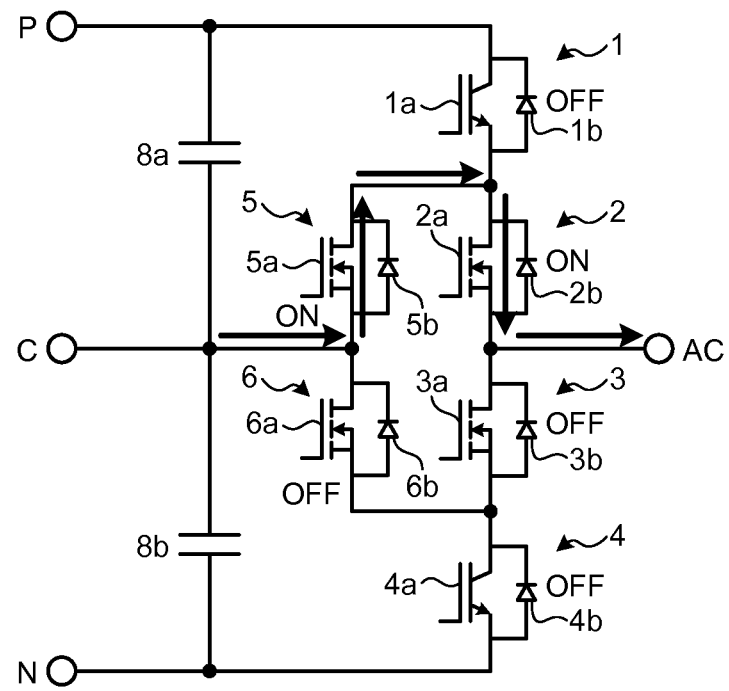
Figure 5:
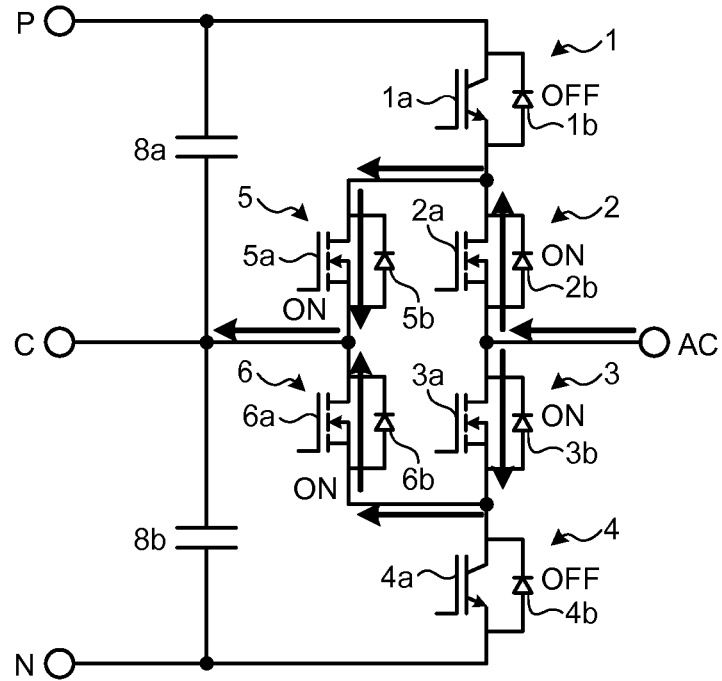
Figure 1:
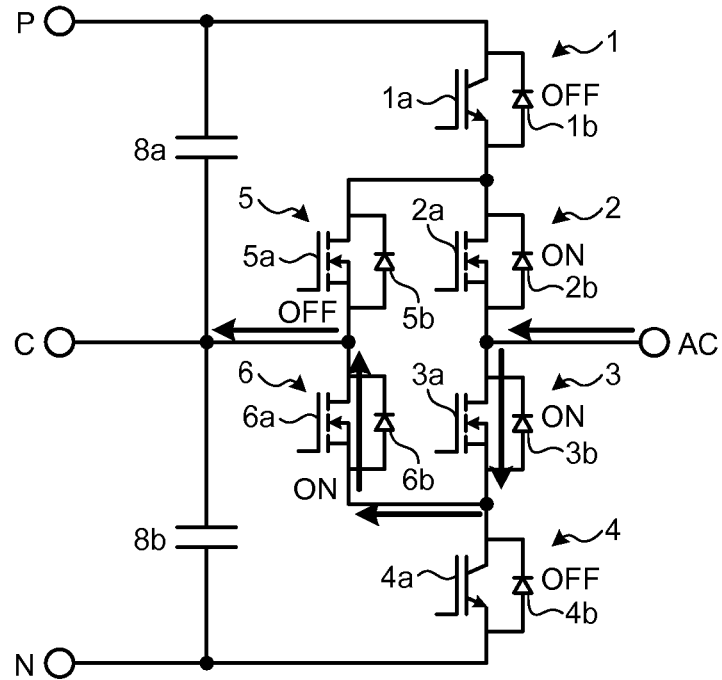
Figure 5:
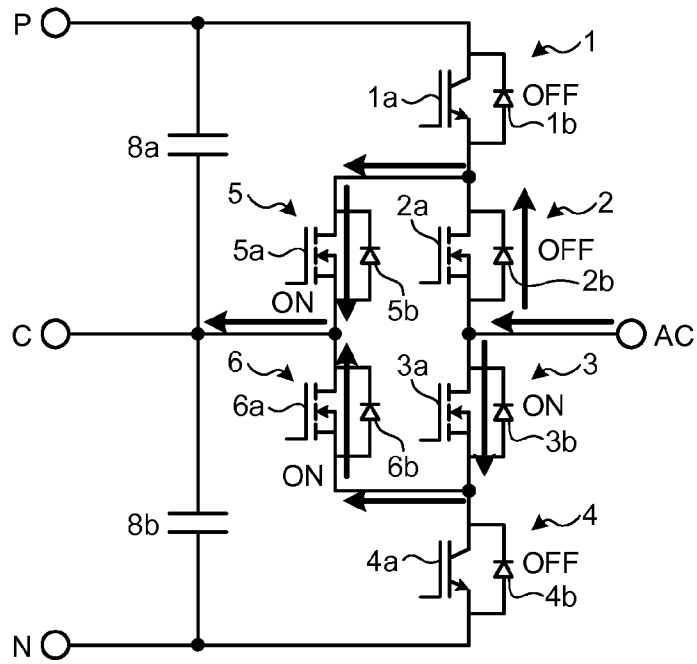
Figure 2:
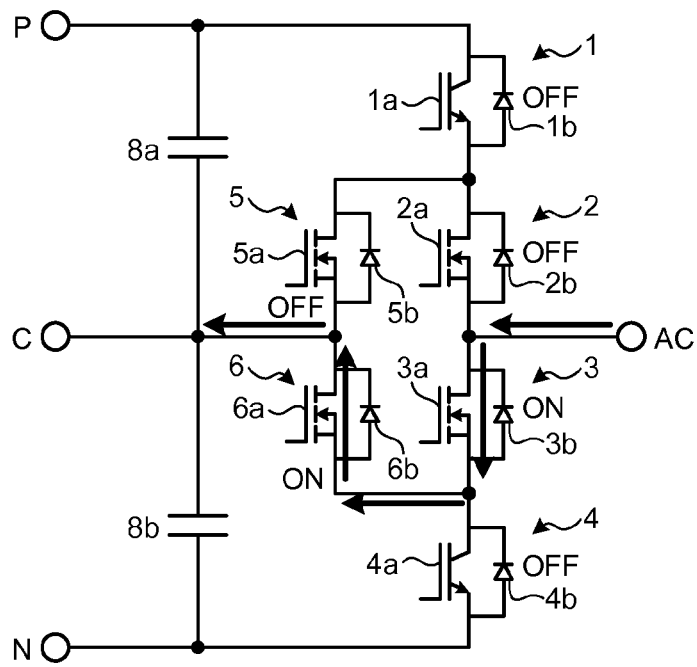
Figure 5:
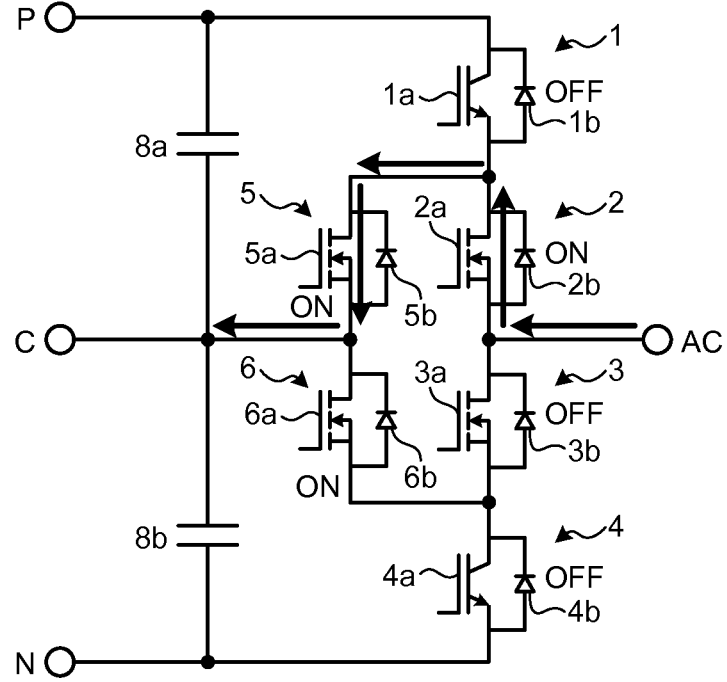
Figure 3:
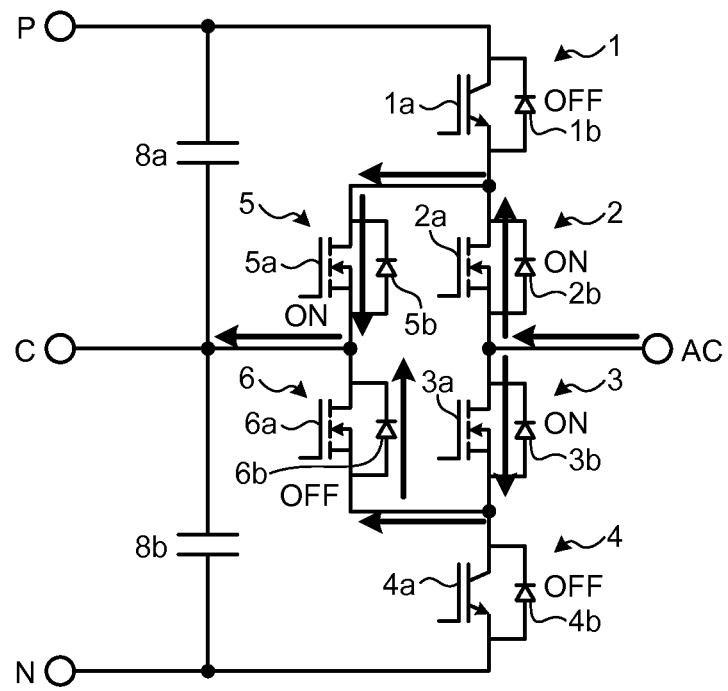
Figures 4, 5:
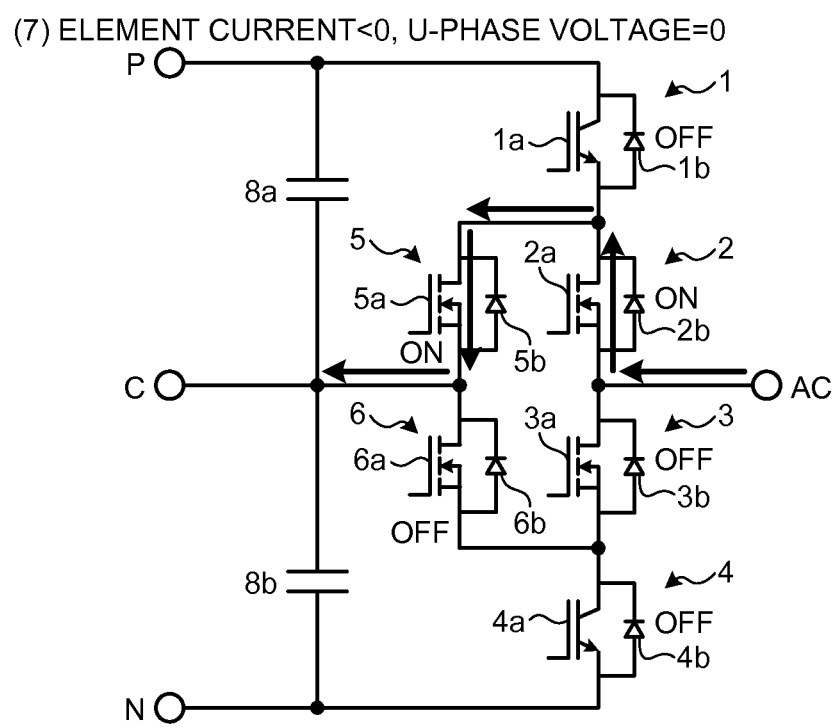

FIG. 4-1 to FIG. 4-4 and FIG. 5-1 to FIG. 5-4 are diagrams for explaining this control. The control performed when the element current is positive (the element current>0) is shown in FIG. 4-1 to FIG. 4-4. The control performed when the element current is negative (the element current<0) is shown in FIG. 5-1 to FIG. 5-4.

Specifically, when the U-phase voltage=0 and the element current is positive (the element current>0) at a normal time, as shown in FIG. 4-1 (1), an ON command is given to the second switching element 2, the third switching element 3, the fifth switching element 5, and the sixth switching element 6. Two paths are used, i.e., a path of the intermediate potential terminal C→the fifth switching element 5→the second switching element 2→the alternating-current terminal AC (for convenience of explanation, referred to as "first path") and a path of the intermediate potential terminal C→the sixth switching element 6→the third switching element 3→the alternating-current terminal AC (for convenience of explanation, referred to as "second path"). However, for example, when the temperature of one or a plurality of switching elements present in the first path is high, as shown in FIG. 4-1 (2), an OFF command only has to be given to the second switching element 2, in which an electric current is flowing only to the channel of the MOSFET, so as to temporarily interrupt the first path and use only the second path. It is made possible to suppress the temperature of the switching elements present in the first path by not feeding an electric current. Note that, in a state shown in FIG. 4-1 (1), to temporarily interrupt the first path, the OFF command can be given to both of the second switching element 2 and the fifth switching element 5 to change the state to a state as shown in FIG. 4-2 (4) explained below. Regarding another case in which one of the paths is temporarily interrupted, besides the switching element, in which an electric current is flowing only to the channel of the MOSFET, can be turned off, the other switching elements of the path can also be turned off.

As another example, as shown in FIG. 4-2 (3), the OFF command can be given to the fifth switching element 5, in which an electric current is flowing to the channel of the MOSFET, the body diode, and the FWD, so as not to feed an electric current to the channel of the MOSFET to temporarily reduce an electric current in the first path. In the figure, when an electric current is not flowing to the channel of the MOSFET, an arrowed line representing a flow of an electric current is displayed near the diode element. It is possible to suppress the temperature of the switching elements present in the first path by reducing the electric current.

If the suppression of the temperature of the switching elements present in the first path is insufficient in a state shown in FIG. 4-2 (3), as shown in FIG. 4-2 (4), it can be arranged such that the OFF command is given to the second switching element 2 as well so as to temporarily interrupt the first path and use only the second path. It is made possible to further suppress the temperature of the switching elements present in the first path by not feeding an electric current.

When the temperature of one or a plurality of switching elements present in the second path is high, as shown in FIG. 4-3 (5), it can be arranged such that the OFF command is given to the sixth switching element 6, in which an electric current is flowing to only the channel of the MOSFET, so as to temporarily interrupt the second path and use only the first path. It is possible to suppress the temperature of the switching elements present in the first path by not feeding an electric current.

As another example, as shown in FIG. 4-3 (6), the OFF command can be given to the third switching element 3, in which an electric current is flowing to the channel of the MOSFET, the body diode, and the FWD, so as not to feed an electric current to the channel of the MOSFET to temporarily reduce an electric current in the second path. It is possible to suppress the temperature of the switching elements present in the second path by reducing the electric current.

If the suppression of the temperature of the switching elements present in the second path is insufficient in a state shown in FIG. 4-3 (6), as shown in FIG. 4-4 (7), it can be arranged such that the OFF command is given to the sixth switching element 6 as well so as to temporarily interrupt the second path and use only the first path. It is possible to further suppress the temperature of the switching elements present in the second path by not feeding an electric current.

If the control explained above is performed, it is possible to reduce the temperature of an element having high temperature compared with the others or eliminate or reduce a temperature rise. There is an effect of suppressing fluctuation in the temperature of the elements.

FIG. 4-1 to FIG. 4-4 are diagrams for explaining a control operation performed when the element current is positive (the element current>0). However, a control operation is the same when the element current is negative (the element current<0). That is, as in the case of the positive element current, when the U-phase voltage=0 and the element current is negative (the element current<0) at a normal time, as shown in FIG. 5-1 (1), the ON command is given to the second switching element 2, the third switching element 3, the fifth switching element 5, and the sixth switching element 6. Two paths are used, i.e., a path of the alternating-current terminal AC→the second switching element 2→the fifth switching element 5→the intermediate potential terminal C (for convenience of explanation, referred to as "third path") and a path of the alternating-current terminal AC→the third switching element 3→the sixth switching element 6→the intermediate potential terminal C (for convenience of explanation, referred to as "fourth path"). However, for example, when the temperature of one or a plurality of switching elements present in the third path is high, as shown in FIG. 5-1 (2), it can be arranged such that the OFF command is given to the fifth switching element 5, in which an electric current is flowing only to the channel of the MOSFET, so as to temporarily interrupt the third path and use only the fourth path. It is possible to suppress the temperature of the switching elements present in the third path by not feeding an electric current.

As another example, as shown in FIG. 5-2 (3), the OFF command can be given to the second switching element 2, in which an electric current is flowing to the channel of the MOSFET, the body diode, and the FWD, so as not to feed an electric current to the channel of the MOSFET to temporarily reduce an electric current in the third path. It is possible to suppress the temperature of the switching elements present in the third path by reducing the electric current.

If the suppression of the temperature of the switching elements present in the third path is insufficient in a state shown in FIG. 5-2 (3), as shown in FIG. 5-2 (4), it can be arranged such that the OFF command is given to the fifth switching element 5 as well to temporarily interrupt the third path and use only the fourth path. It is possible to further suppress the temperature of the switching elements present in the third path by not feeding an electric current.

If the temperature of one or a plurality of switching elements present in the fourth path is high, as shown in FIG. 5-3 (5), the OFF command only has to be given to the third switching element 3, in which an electric current is flowing only to the channel of the MOSFET, to temporarily interrupt the fourth path and use only the third path. It is possible to suppress the temperature of the switching elements present in the fourth path by not feeding an electric current.

As another example, as shown in FIG. 5-3 (6), the OFF command can be given to the sixth switching element 6, in which an electric current is flowing to the channel of the MOSFET, the body diode, and the FWD, so as not to feed an electric current to the channel of the MOSFET to temporarily reduce an electric current in the fourth path. It is possible to suppress the temperature of the switching elements present in the fourth path by reducing the electric current.

If the suppression of the temperature of the switching elements present in the fourth path is insufficient in a state shown in FIG. 5-3 (6), as shown in FIG. 5-4 (7), it can be arranged such that the OFF command is given to the third switching element 3 as well to temporarily interrupt the fourth path and use only the third path. It is possible to further suppress the temperature of the switching elements present in the fourth path by not feeding an electric current.

If the control explained above is performed, it is possible to reduce the temperature of an element having high temperature or eliminate or reduce a temperature rise. There is an effect of suppressing fluctuation in the temperature of the elements.

Even in a case in which conduction or non-conduction of a switching element is controlled as in the past, by using, instead of the IGBT, the MOSFET that enables an electric current to flow to the channel in two directions, current paths increase and a loss can be reduced. This effect is explained below.

As shown in FIG. 3-2 (4), when U-phase voltage=1 and the element current is negative (the element current<0), an electric current flows only to the FWD when the second switching element 2 is an IGBT. In this embodiment, because the second switching element 2 is configured by a MOSFET, as shown in FIG. 2-2 (4), in the second switching element 2 that is turned on to output the U-phase voltage=1, an electric current flows to the three paths of the channel of the MOSFET, the body diode, and the FWD. Compared with the IGBT, because the electric current also flows to the channel of the MOSFET and the body diode, current density decreases and a loss decreases. Note that, if the first switching element 1 is also configured by the MOSFET, the effect of reducing a loss further increases.

The same applies to the case in which the U-phase voltage=−1 and the element current is positive (the element current>0). As shown in FIG. 3-2 (3), when the third switching element 3 is an IGBT, an electric current flows only to the FWD. In this embodiment, because the third switching element 3 is configured by the MOSFET, as shown in FIG. 2-2 (3), in the third switching element 3 that is turned on to output the U-phase voltage=−1, an electric current flows to the three paths of the channel of the MOSFET, the body diode, and the FWD. Compared with the IGBT, because the electric current also flows to the channel of the MOSFET and the body diode, current density decreases and a loss decreases. Note that, if the fourth switching element 4 is also configured by the MOSFET, the effect of reducing a loss further increases.

Figure 6:
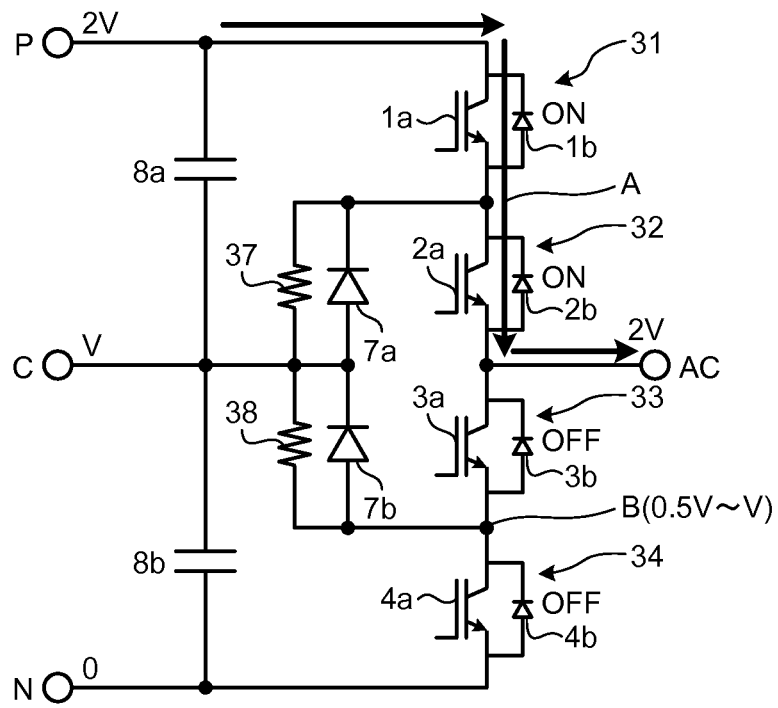
FIG. 6 is a diagram of the configuration of a power conversion circuit according to a related art including balance resistors for potential stabilization.

Balance resistors for potential stabilization are explained. FIG. 6 is a diagram of the configuration of a power conversion circuit according to a related art including balance resistors for potential stabilization. The voltage of the capacitor 8a and that of capacitor 8b are controlled to be the same. When the voltage is represented by a variable V, in FIG. 6, the potential of the upper-side direct-current terminal P is 2V, the potential of the intermediate potential terminal C is V, and the potential of the lower-side direct-current terminal N is 0. When all of a first switching element 31, a second switching element 32, a third switching element 33, and a fourth switching element 34 are off, if an initial condition that a uniform voltage is applied to the elements is assumed, a voltage applied to both the ends of the elements is 0.5V. In this state, the potential of the alternating-current terminal AC is V. When the first switching element 31 and the second switching element 32 are controlled to be on and the third switching element 33 and the fourth switching element 34 are controlled to be off from this state, an electric current shown in FIG. 6 flows. Here, the ON resistance of the first switching element 31 and the second switching element 32 is small, so that if the ON resistance is assumed to be 0, the potential of the alternating-current terminal AC is 2V. The potential of the alternating-current terminal AC, which is V when all the switching elements are off, rises by V to become 2V. When resistors for potential stabilization 37 and 38 are absent, whether the third switching element 33 bears the voltage rise V or the fourth switching element 34 bears the voltage rise V changes according to a situation. However, if the potential of a connecting section B of the third switching element 33 and the fourth switching element 34 becomes higher than V, the clamp diode 7b conducts and reduces the potential to V. Therefore, the potential of the connecting section B takes values of 0.5V to V and becomes unstable For example, when the potential of the connecting section B is 0.5V, a voltage of 1.5V (2V-0.5V), that is, a voltage three times as high as the voltage applied when all the elements are non-conductive is applied to the third switching element 33. The resistors for potential stabilization 37 and 38 shown in FIG. 6 are resistors for stabilizing such unstable potential. The object of the resistors for potential stabilization 37 and 38 is to match the potential of the connecting sections A and B to the potential of the intermediate potential terminal C respectively via the resistors for potential stabilization 37 and 38.

On the other hand, in the three-level power converting apparatus according to the first embodiment, in a period in which the potential of the intermediate potential terminal C is output to the alternating-current terminal AC during a cycle of switching control, the fifth switching element 5 and the sixth switching element 6 are controlled so as to be on. The potential of the connecting sections A and B substantially coincides with the potential of the intermediate potential terminal C. Therefore, the resistors for potential stabilization 37 and 38 can be made unnecessary.

As explained above, with the three-level power converting apparatus according to the first embodiment, among the first to sixth switching elements including the transistor elements and the diodes connected in reverse parallel to the transistor elements, the first to fourth transistor elements are configured by IGBTs and the second, third, fifth, and sixth transistor elements are configured by the MOSFETs that enable an electric current to flow in two directions. Therefore, because it is possible to increase current paths in outputting the intermediate point potential, there is an effect that it is made possible to attain a reduction in a conduction loss and heat equalization of the elements.

With the three-level power converting apparatus according to the first embodiment, because the resistors for potential stabilization provided in the past are made unnecessary, it is possible to reduce costs through a reduction in the number of components. Because a power loss in the resistors for potential stabilization is eliminated, it is made possible to assemble the three-level power converting apparatus higher in efficiency than in the past.

Second Embodiment

Figure 7:
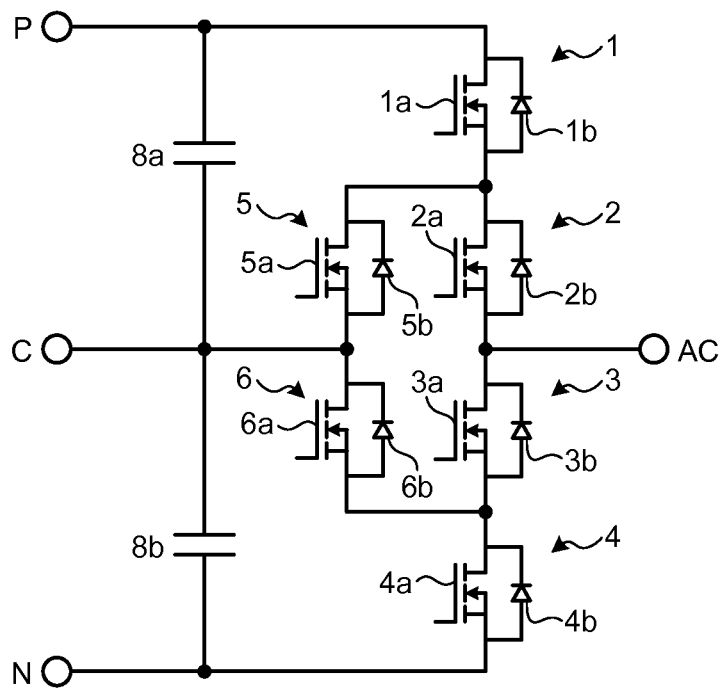
FIG. 7 is a partial circuit diagram for explaining the circuit configuration of a three-level power converting apparatus according to a second embodiment.

FIG. 7 is a partial circuit diagram for explaining the circuit configuration of a three-level power converting apparatus according to a second embodiment of the present invention. In the three-level power converting apparatus in the first embodiment, the four transistor elements around the neutral point are configured by the MOSFETs that enable an electric current to flow in two directions. However, in the second embodiment, all transistor elements are configured using MOSFETs. With this configuration, all the elements have the same configuration. Therefore, there is an effect that the three-level power converting apparatus can be assembled by element modules of the same type and it is made unnecessary to prepare a plurality of types of element modules.

The configuration of the three-level power converting apparatus according to the second embodiment is explained. Recently, a two-element module formed by housing two elements in one module is sometimes used. If the two-element module is used, one phase of the three-level power converting apparatus can be configured by three modules. When one phase is configured by three modules, for example, if the three-level power converting apparatus is modularized according to the division indicated by broken lines in FIG. 8, the current capacity of a module 10A, in which the fifth switching element 5 and the sixth switching element 6 are united, can be set smaller compared with the current capacity of the other modules 10B and 10C. For example, when the three-level power converting apparatus is modularized according to divisions indicated by broken lines in FIG. 9, the current capacity of a module 11A, in which the second switching element 2 and the third switching element 3 are united, can be set small compared with the current capacity of the other modules 11B and 11C.

Figure 9:
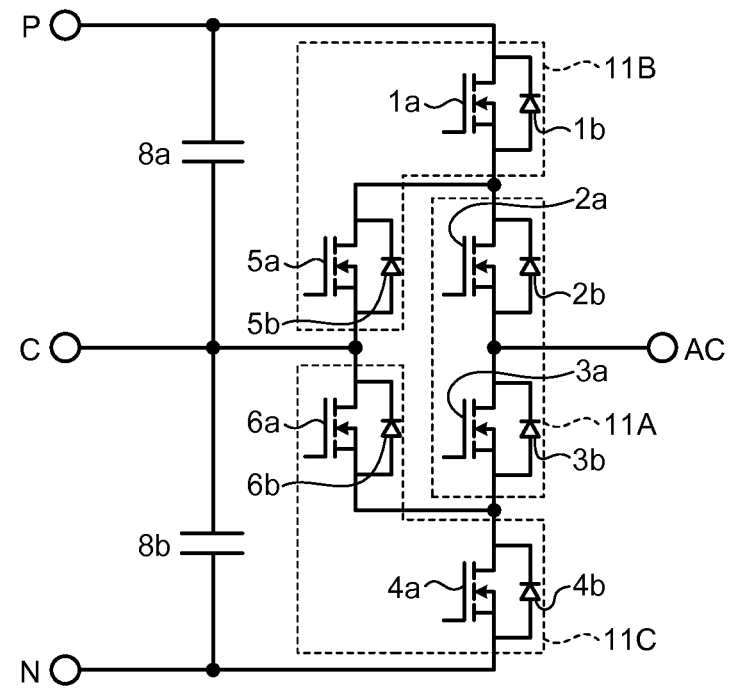
FIG. 9 is a diagram of another division example of the three-level power converting apparatus configured using two-element modules.

Note that, in a module configuration shown in FIG. 9, there is an effect that it is possible to configure a low-inductance circuit making use of characteristics of the two-element module. This effect is explained with reference to FIG. 10.

Figure 10:
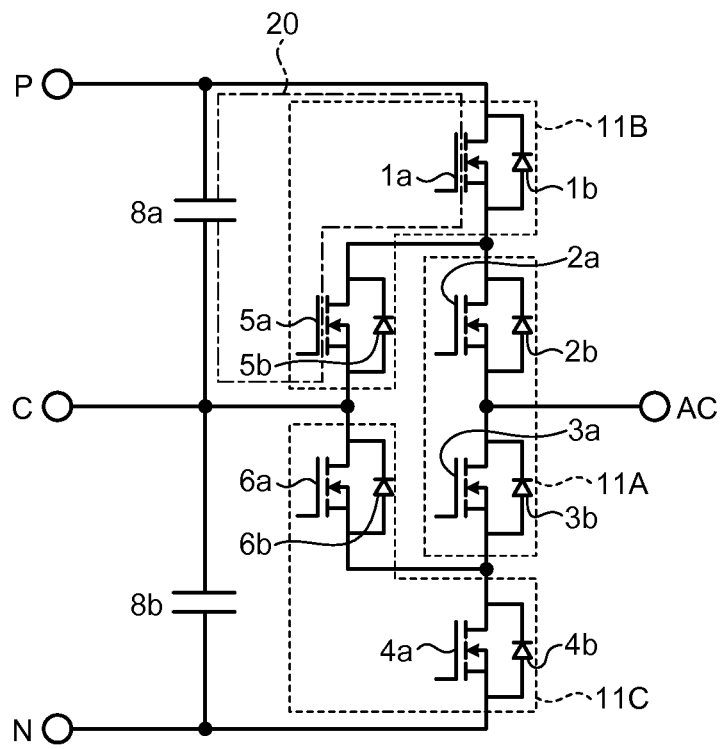
FIG. 10 is a diagram in which an inductance loop is added to the circuit diagram of FIG. 9.

FIG. 10 is a diagram in which an inductance loop 20 is added to the circuit diagram of FIG. 9. The inductance loop 20 shown in the figure is a loop well known as one of loops indicating a path affected by a steep current change ratio (di/dt) during switching. A path indicated by the inductance loop 20 excluding only the portion of a direct-current link section communicates with the inside of the module 11B. There is no path extending across modules and the inductance loop is short and small. Therefore, with this configuration, it is possible to form the inductance loop 20 as a low-inductance circuit. Therefore, as a use in which the low-inductance circuit is requested, the module configuration shown in FIG. 9 is extremely useful when the module configuration is used as, for example, a three-level power converting apparatus for a railroad vehicle that treats a large current.

Figure 8:
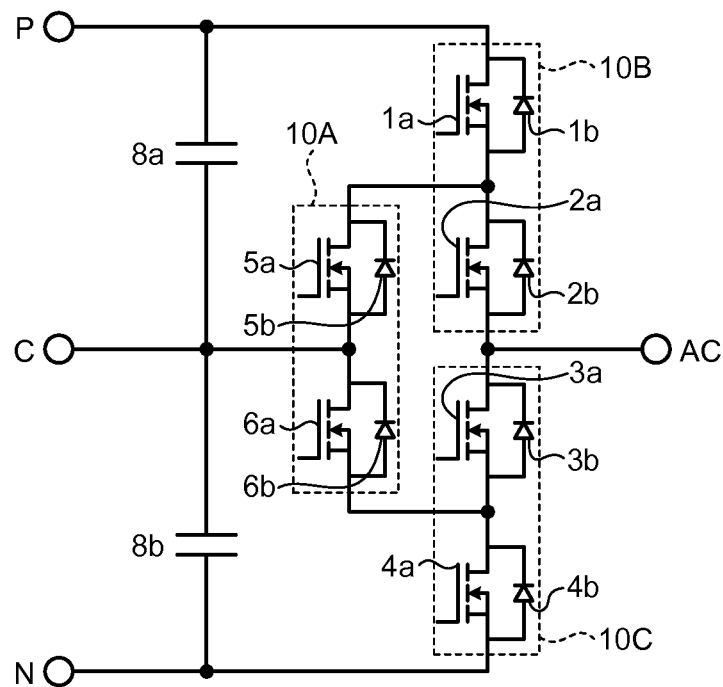
FIG. 8 is a diagram of a division example of the three-level power converting apparatus configured using two-element modules.

As explained above, when the three-level power converting apparatus according to the second embodiment is configured using a two-element module, the three-level power converting apparatus is adaptable to, for example, both of the module configuration shown in FIG. 8 and the module configuration shown in FIG. 9. Therefore, there is an effect that the three-level power converting apparatus has flexibility in configuring the two-element module.

Third Embodiment

In a third embodiment, a material forming a transistor element and a diode element is explained. In general, the material of a transistor element and a diode element used in a power conversion circuit is silicon (Si). The technologies explained in the first and second embodiments can be configured using this general Si element.

On the other hand, the technology in the first and second embodiments is not limited to the Si element. The technology can also be configured using a transistor element (an SiC element) and a diode element (an SiC element) including silicon carbide (SiC), which attracts attention in recent years, as a material instead of silicon (Si).

Compared with the Si element, the SiC element has excellent characteristics that a heat transfer coefficient is large, operation at high temperature is possible, and a switching loss is small. It is possible to receive benefits of the SiC element by using the SiC element in one or both of the transistor element and the diode element of the power conversion circuit. That is, because the heat transfer coefficient is large and the operation at high temperature is possible, it is possible to reduce the size of a cooling mechanism and further reduce the size of a module. Because the switching loss is small, heat generation is suppressed. It is possible to reduce the size of the cooling mechanism and further reduce the size of the module.

Note that, in view of a characteristic that a band gap of the SiC is larger than a band gap of the Si, the SiC is an example of a semiconductor called wide band gap semiconductor (on the other hand, the Si is called narrow band gap semiconductor). Apart from the SiC, for example, a semiconductor formed using a gallium nitride material or diamond also belongs to the wide band gap semiconductor. Characteristics of the gallium nitride material and the diamond have many similarities to the silicon carbide. Therefore, configurations in which the wide band gap semiconductors other than the SiC are used also form the gist of the present invention.

In this way, the SiC element is an extremely prospective element. However, a manufacturing technology for the SiC element is underdeveloped compared with a manufacturing technology for the Si element. For example, the diameter of an SiC wafer, which is an element material, is smaller than the diameter of an Si wafer. A large number of defects are included in the SiC wafer. When a chip size increases or when the number of chips arranged in parallel increases, the yield of the SiC element is deteriorated more than the yield of the Si element. The deterioration in the yield causes deterioration in reliability of the element and an increase in manufacturing costs of the element. That is, in order to use the SiC element in one or both of the transistor element and the diode element of the power conversion circuit using the current manufacturing technology for the SiC element, it is requested to reduce the chip size of the SiC element and reduce the number of chips arranged in parallel. In the present invention, control is performed to provide a plurality of current flow paths for outputting the neutral point potential to the alternating-current terminal. Therefore, it is possible to reduce an electric current flowing to the paths. According to the present invention, it is made possible to realize the power conversion circuit in which the chip size of the SiC element is reduced, the number of chips arranged in parallel is reduced, and the SiC element is also used. In this way, the present invention is particularly useful in the power conversion circuit in which the SiC element is used.

Fourth Embodiments

Figure 11:
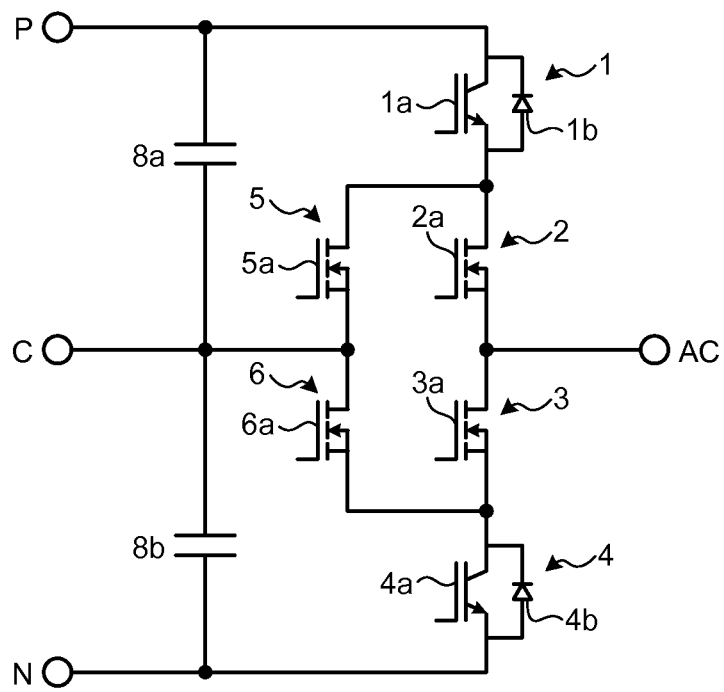
FIG. 11 is a partial circuit diagram for explaining the circuit configuration of a three-level power converting apparatus according to a fourth embodiment.

FIG. 11 is a partial circuit diagram for explaining the circuit configuration of a three-level power converting apparatus according to a fourth embodiment of the present invention. In the three-level power converting apparatus in the first embodiment, the four transistor elements around the neutral point are configured by the MOSFETs that enable an electric current to flow in two directions and the diode elements connected in reverse parallel to the MOSFETs. However, in the fourth embodiment, the four transistor elements around the neutral points are configured by only the MOSFETs that enable an electric current to flow in two directions.

Because each of the MOSFETs includes body diode, the three-level power converting apparatus can operate as a power converting apparatus even if no diode element is provided therein. The operation is the same as the operation in the first embodiment. Because the diode element does not have to be provided, it is possible to reduce the size of the module.

Fifth Embodiment

Figure 12:
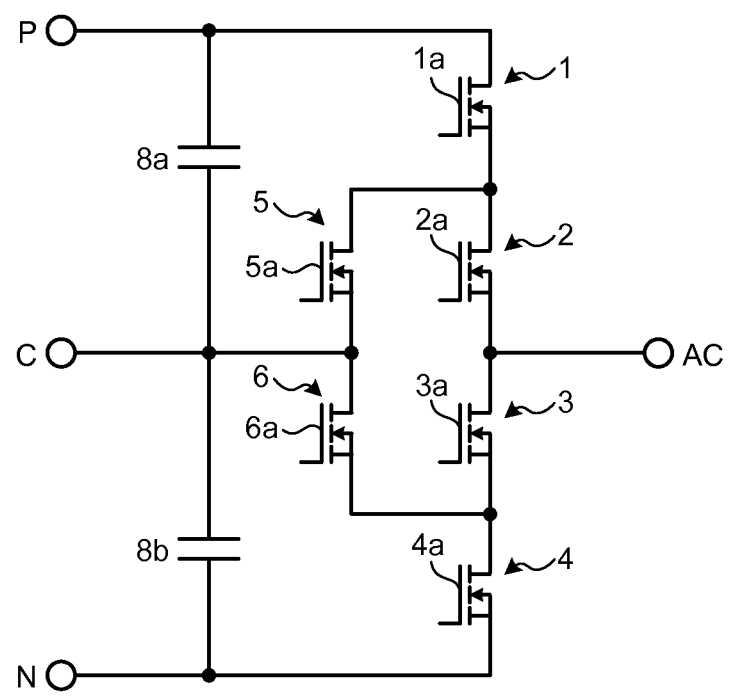
FIG. 12 is a partial circuit diagram for explaining the circuit configuration of a three-level power converting apparatus according to a fifth embodiment.

FIG. 12 is a partial circuit diagram for explaining the circuit configuration of a three-level power converting apparatus according to a fifth embodiment of the present invention. In the three-level power converting apparatus in the second embodiment, all the transistor elements are configured by the MOSFETs that enable an electric current to flow in two directions and the diode elements connected in reverse parallel to the MOSFETs. However, in the fifth embodiment, all the transistor elements are configured by only the MOSFETs that enable an electric current to flow in two directions.

Because all the elements have the same configuration, as in the second embodiment, there is the effect that the three-level power converting apparatus can be assembled by the element modules of the same type and it is made unnecessary to prepare a plurality of types of element modules. The method of configuring the modules, operations, and effects are the same as those in the second embodiment. Because the diode elements do not have to be provided, it is made possible to reduce the size of modules.

Note that the configurations explained in the first to fifth embodiments above are examples of the configuration of the present invention. It goes without saying that the configurations can be combined with other publicly-known technologies or can be configured to be changed to, for example, omit a part of the configurations in a range without departing from the spirit of the present invention.

INDUSTRIAL APPLICABILITY

As explained above, the three-level power converting apparatus according to the present invention is useful as an invention that enables a reduction of a conduction loss.

REFERENCE SIGNS LIST 1, 31 First switching elements
2, 32 Second switching elements
3, 33 Third switching elements
4, 34 Fourth switching elements 5 Fifth switching element
6 Sixth switching element
10A, 10B, 10C, 11A, 11B, 11C Modules
20 Inductance loop
37, 38 Resistors for potential stabilization
A, B Connection ends
AC Alternating-current terminal
P Upper-side direct-current terminal
C Intermediate potential terminal
N Lower-side direct-current terminal

The invention claimed is:

1. A three-level power converting apparatus comprising:
a power conversion circuit for one phase that selects potential of any one of an upper-side direct-current terminal, an intermediate potential terminal, and a lower-side direct-current terminal and outputs the potential to an alternating-current terminal;
the power conversion circuit includes:
first, second, third, and fourth switching elements sequentially connected in series between the upper-side direct-current terminal and the lower-side direct-current terminal;
a fifth switching element connected between a connecting section of the first switching element and the second switching element and the intermediate potential terminal;
a sixth switching element connected between a connecting section of the third switching element and the fourth switching element and the intermediate potential terminal; and
the alternating-current terminal being connected to a connecting section of the second switching element and the third switching element;
wherein each of the second, third, fifth and sixth switching elements includes a diode element and a MOSFET (metal-oxide-semiconductor field-effect transistor) including a body diode, wherein electric current can flow in two directions through the MOSFET and the body diode, and wherein both of the first and fourth switching elements include IGBTs (insulated-gate bipolar transistors); and further wherein
when outputting the potential of the intermediate potential terminal to the alternating-current terminal, the three-level power converting apparatus controls the MOSFETs of the second, third, fifth and sixth switching elements to be turned on simultaneously, and an electric current is simultaneously fed to the MOSFET, the body diode of the MOSFET and the diode element included in the fifth switching element and to the MOSFET, the body diode of the MOSFET and the diode element included in the sixth switching element.

2. The three-level power converting apparatus according to claim 1, wherein when outputting the potential of the intermediate potential terminal to the alternating-current terminal, the three-level power converting apparatus performs control such that, among the MOSFETs of the second, third, fifth, and sixth switching elements, at least one of the MOSFETs present on a current flow path including an element and having the highest temperature or an element having the largest temperature rise is turned off.

3. The three-level power converting apparatus according to claim 1, wherein the fifth switching element is provided in a module different from that of the second switching element, or the sixth switching element is provided in a module different from that of the third switching element.

4. The three-level power converting apparatus according to claim 1, wherein the second switching element is provided in a module different from that of the third switching element.

5. The three-level power converting apparatus according to claim 1, wherein one or both of the MOSFETs and the diode elements are formed of a wide band gap semiconductor.

6. The three-level power converting apparatus according to claim 5, wherein the wide band gap semiconductor is a semiconductor in which silicon carbide, a gallium nitride material, or diamond is used.

7. A three-level power converting apparatus comprising:
a power conversion circuit for one phase that selects potential of any one of an upper-side direct-current terminal, an intermediate potential terminal, and a lower-side direct-current terminal and outputs the potential to an alternating-current terminal;
the power conversion circuit includes:
first, second, third, and fourth switching elements sequentially connected in series between the upper-side direct-current terminal and the lower-side direct-current terminal;
a fifth switching element connected between a connecting section of the first switching element and the second switching element and the intermediate potential terminal;
a sixth switching element connected between a connecting section of the third switching element and the fourth switching element and the intermediate potential terminal; and
the alternating-current terminal being connected to a connecting section of the second switching element and the third switching element;
wherein each of the second, third, fifth and sixth switching elements includes a diode element and a MOSFET (metal-oxide-semiconductor field-effect transistor) including a body diode, wherein electric current can flow in two directions through the MOSFET and the body diode, and wherein both of the first and fourth switching elements include IGBTs (insulated-gate bipolar transistors); and further wherein
when outputting the potential of the intermediate potential terminal to the alternating-current terminal, the three-level power converting apparatus controls the MOSFETs of the second, third, fifth and sixth switching elements to be turned on simultaneously, and an electric current is simultaneously fed to three paths conformed by a channel of the MOSFET, the body diode of the MOSFET and the diode element included in the fifth switching element and to three paths conformed by a channel of the MOSFET, the body diode of the MOSFET and the diode element included in the sixth switching element.

8. The three-level power converting apparatus according to claim 7, wherein when outputting the potential of the intermediate potential terminal to the alternating-current terminal, the three-level power converting apparatus performs control such that, among the MOSFETs and the diode elements of the second, third, fifth, and sixth switching elements, at least one of the MOSFETs present on a current flow path and including an-element having the highest temperature or an element having the largest temperature rise is turned off.

9. The three-level power converting apparatus according to claim 7, wherein the second switching element is provided in a module different from that of the third switching element.

10. The three-level power converting apparatus according to claim 7, wherein, one or both of the MOSFETs and the diode elements are formed of a wide band gap semiconductor.

11. The three-level power converting apparatus according to claim 10, wherein the wide band gap semiconductor is a semiconductor in which silicon carbide, a gallium nitride material, or a diamond is used.

* * * * *